(12) United States Patent
Nobuchi

(10) Patent No.: US 6,175,492 B1
(45) Date of Patent: Jan. 16, 2001

(54) SMALL-SIZED PORTABLE INFORMATION PROCESSING APPARATUS HAVING COOLING MEANS

(75) Inventor: Atsunobu Nobuchi, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/065,566

(22) Filed: Apr. 24, 1998

(30) Foreign Application Priority Data

Sep. 4, 1997 (JP) .................................................. 9-239868

(51) Int. Cl.$^7$ ................................. G06F 1/20; H05K 7/20
(52) U.S. Cl. ........................................... 361/687; 361/680
(58) Field of Search .............................. 361/680, 687; 292/163; 364/708.1; 454/184

(56) References Cited

U.S. PATENT DOCUMENTS

| 5,694,294 | 12/1997 | Ohashi et al. . | |
|---|---|---|---|
| 5,754,395 | * 5/1998 | Hsu et al. ............................. | 361/680 |
| 5,818,360 | * 10/1998 | Chu et al. ............................. | 361/680 |
| 6,008,986 | * 12/1999 | Mok ..................................... | 361/680 |
| 6,028,768 | * 2/2000 | Cipolla ................................ | 361/680 |

FOREIGN PATENT DOCUMENTS

| 2 266 360 | 10/1993 | (GB) . |
|---|---|---|
| 4-290107 | 10/1992 | (JP) . |
| 5-250091 | 9/1993 | (JP) . |
| 5-304379 | 11/1993 | (JP) . |
| 7-319579 | 12/1995 | (JP) . |
| 8-263162 | 10/1996 | (JP) . |
| 9-034590 | 2/1997 | (JP) . |

* cited by examiner

Primary Examiner—Lynn D. Feild
(74) Attorney, Agent, or Firm—Armstrong, Westerman, Hattori, McLeland & Naughton

(57) ABSTRACT

A small-sized portable information processing apparatus includes an apparatus body and an operating section movably connected to the apparatus body between an inclined position in which an air introduction port formed between the apparatus body and the operating section is opened and a horizontal position in which the air introduction port is closed. A lid is movably connected to the apparatus body in such a manner that the lid is opened or closed with respect to the apparatus body. The operating section is moved to its inclined position upon the movement of the lid toward the open position and to its horizontal position upon the movement of the lid toward the closed position. A locking/releasing means is provided for locking the operating section to its inclined position at the open position of the lid and for releasing the operating section upon the movement of the lid toward the closed position.

8 Claims, 5 Drawing Sheets

SMALL-SIZED PORTABLE INFORMATION PROCESSING APPARATUS HAVING COOLING MEANS

BACKGROUND OF THE INVENTION

1. Field of the Invention

The present invention relates to a small-sized portable information processing apparatus, such as a portable calculation machine, a portable computer, a word processor, an electronic notebook or the like and, more particularly, relates to a small-sized and light-weight portable information processing apparatus having a cooling means.

During the recent development of small-sized portable information processing apparatuses, it has been required that the devices should be easy to handle. On the other hand, upon developments of high-speed electronic elements, such CPUs or the like, and a smaller sized information processing apparatus, it has been required that such an apparatus should effectively be cooled so that the heat from the CPU or the like be removed.

2. Description of the Related Art

A conventional type small-sized portable information processing apparatus comprises an apparatus body having an input section, i.e., a keyboard, and a lid section provided with a liquid crystal display which is pivotably attached to the apparatus body by means of a hinge, so that the liquid crystal display can be opened or closed with respect to the apparatus body. It is known that, in order to easily handle such an apparatus during an input operation, the keyboard may be inclined when the liquid crystal display is opened with respect to the apparatus body.

For example Unexamined Patent Publication (Kokai) No. 7-319579 (JPP'579) discloses that a keyboard cooperates with an apparatus body to automatically incline so that an input operation can easily performed when a display is pivotably opened with respect to the apparatus body by means of a hinge. Also, Unexamined Patent Publication (Kokai) No. 5-250091 (JPP'091) discloses that, after a lid section is opened to expose a keyboard and then the keyboard is inclined with respect to the apparatus body, a track ball is exposed so that the track ball can be handled.

On the other hand, upon development of high-speed electronic elements, such as CPU or the like, and a smaller sized information processing apparatus, it has been required that such an apparatus should be effectively cooled so that the heat generated by the CPU or the like during the operation thereof can be removed. In this connection, the following cooling means are known. For example, Unexamined Patent Publication (Kokai) No. 4-290107 (JPP'107) discloses that an apparatus body is provided with an air suction port at a wall thereof and an air outlet port at the back of a hinge to effectively cool the apparatus and prevent dust from entering into the inside thereof. Also, Unexamined Patent Publication (Kokai) Nos. 5-304379 (JPP'379) and 8-263162 (JPP'162) disclose that an apparatus body is provided with an air suction port at a wall thereof and a small-sized fan to forcibly remove the heat generated by the electronic elements in the apparatus.

In addition, Unexamined Patent Publication (Kokai) No. 9-34590 (JPP'590) discloses that, when a display is opened by means of a hinge with respect to an apparatus body, the keyboard is automatically inclined and simultaneously an air port is formed between the apparatus body and the keyboard, so that an input operation can easily performed and also a cooling effect of the apparatus can be improved.

However, the above-mentioned apparatuses known in the prior art have the following disadvantages. For example, as disclosed in JPP'579 and JPP'091, if a keyboard is inclined with respect to the apparatus body to a position in which an input operation can be easily performed, the cooling efficiency is not sufficient so that it is not suitable for a highly dense mounting, although the keyboard input operation can effectively be performed.

In addition, in the apparatus having a cooling air inlet port as disclosed in JPP'107, or the apparatus having a cooling fan as disclosed in JPP'379 and JPP'162, the keyboard is not inclined with respect to the apparatus body when the lid is opened and, therefore, an input operation cannot easily be performed, although the cooling efficiency is relatively good.

Also, a cooling fan gives rise to a problem of noise generation, a provision of a heat radiation plate or the like has a limit in the cooling efficiency, and provision of air port gives rise to a problem that the size of the air port is not sufficient to obtain a good cooling efficiency in view of the size reduction and various needs for the apparatus.

In JPP'590, during the operation state in which a display is opened, the keyboard is automatically inclined and simultaneously an air port is formed between the apparatus body and the keyboard. Therefore, the input operation can easily be performed and also a cooling effect of the apparatus can be improved.

However, in JPP'590, the keyboard is pivotably connected to the apparatus body by means of a slide hinge and thus the lid having a display and keyboard are directly connected to each other by means of hinge, the inclined angle of the display is changed in accordance with the angle of the display, which is not constant during the operation. Since there is no means for locking the keyboard at a constant angle, the inclined angle can be changed when an external force is exerted onto the keyboard during the input operation.

SUMMARY OF THE INVENTION

Accordingly, an object of the present invention is to provide a small-sized portable information processing apparatus having a cooling means, in which the keyboard operation can be easily and stably performed and an effective cooling can be attained with a simple structure.

According to the present invention, there is provided a processing apparatus comprising: an apparatus body; an operating section movably connected to the apparatus body and able to move between an inclined position, in which an air introduction gap formed between the apparatus body and the operating section is opened, and a horizontal position in which the air introduction port is closed; a lid movably connected to the apparatus body between an open position and a closed position; a cooperating means for cooperatively moving the operating section to its inclined position upon the movement of the lid toward the open position and to its horizontal position upon the movement of the lid toward the closed position; a locking/releasing means for locking the operating section to its inclined position at the open position of the lid and for releasing the operating section upon the movement of the lid toward the closed position.

In this invention, when the lid is opened in an operable condition, the operating section is automatically moved to its inclined position and also locked at this inclined position, so that a good operability and stable operation can be attained. In this state, since the air introduction port is formed, the cooling air flows into the inside of the apparatus body (between the operating section and the apparatus body) to improve the cooling characteristic. When the lid is moved toward its closed position, the lock is automatically released and thus the operating section is moved to its horizontal position.

The lid is provided with a display and the operating section is constituted as a keyboard. The operating section may be any type, such as a pen touch panel. However, the operating section is typically a keyboard.

The cooperating means comprises: a spring for urging the operating section toward its inclined position; a projection provided on the lid; an actuating means provided on the apparatus body to be engageable with the projection; and the actuating means engaging with the projection to move the operating section to its inclined position upon the movement of the lid toward the open position against the spring and disengaging from the projection to allow the operating section to move its horizontal position upon the movement of the lid toward the closed position.

According to this embodiment, when the lid is moved toward its open or closed position, the projection comes into engagement with the actuating means to move said operating section from its closed position to its opened position, and on the other hand, from its opened position to its closed position, respectively.

The actuating means comprises a hinge member having one end connected to the operating section and the other end slidably connected to the apparatus body so as to be engageable with the projection. The projection engages with the other end of the hinge member to slidingly move the hinge member to move the operating section.

The hinge member is a strip which comprises a first portion connected to the operating section, a second portion pivotably connected to the first portion and a third portion pivotably connected to the second portion, the third portion being slidably supported on the apparatus body and having a raised portion engageable with the projection in such a manner that, when the operating section is in the inclined position, the second portion is bent by nearly 90° with respect to the first and third portions, respectively, and when the operating section is in the horizontal position, the second portion is kept substantially horizontal with respect to the first and third portions, respectively.

In this embodiment, when the operating section is in its inclined position, the intermediate, second portion is bent by nearly 90° with respect to the first and third portions, respectively. Thus, even if the operating section is pushed downward, since the pushing direction is substantially the same as the direction of the second portion, the operating section is locked and cannot return to its horizontal position.

The locking/releasing means comprises the hinge member and a stopper for preventing the second portion from being bent beyond 90° with respect to the first and third portions at the inclined position of the operating section. When the operating section is in its inclined position, the second portion is locked by a hinge member to maintain its position.

The actuating means comprises a guide member slidingly mounted on the apparatus body and an angle changing means for changing an angle of the operating section actuated in accordance with a sliding movement of the guide member. Upon engagement of the projection with the guide member, the guide member slidingly moves to operate the angle changing means.

The angle changing means comprises a flange fixed to the operating section and has an elongated slot, a ratchet member having a pin engaged with the elongated slot, and a spring for urging the ratch member to move the operating section toward its horizontal position. The ratch member is rotated against the spring to actuate the operating section through said pin and the elongated hole of the operating section.

The guide member is provided with an opening having respective edges and the ratch member is provided with an extension, so that, when the lid is in its closed position, one of the edges of the opening engages with the extension of the ratch member to lock the operating section at the inclined position and, when the lid is moved toward its closed position, the one edge of the opening is disengaged from the extension of the ratch member and the other edge of the opening pushes and rotates the operating section to move it toward its horizontal position. The respective edges of the opening in the sliding directions operate to perform the locking and the angle changing, respectively.

DETAILED DESCRIPTION OF THE EMBODIMENTS

Figure 1:
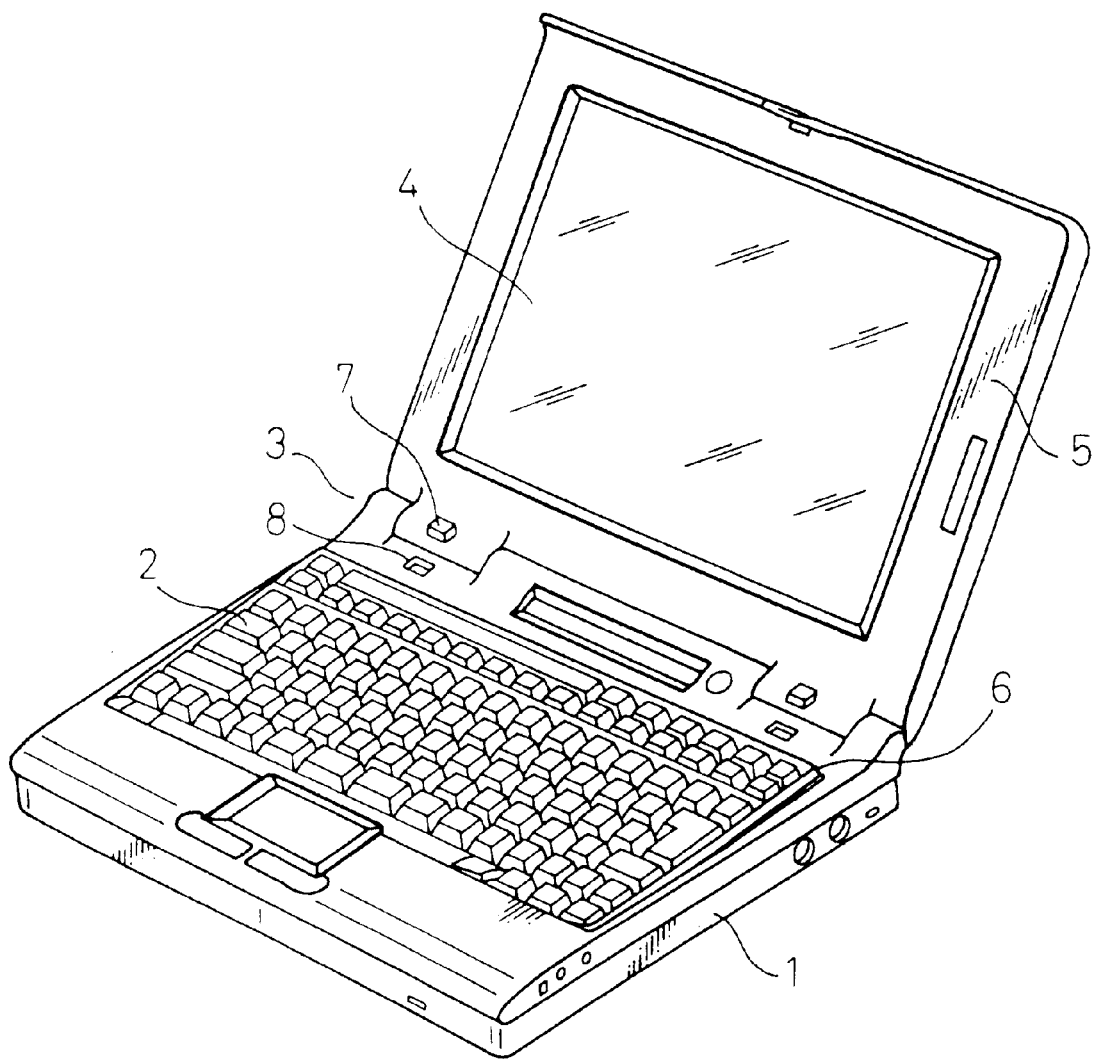
FIG. 1 is a perspective view of a small-sized portable information processing apparatus, having a cooling means of this invention, with a lid opened.

Referring now to the drawings, FIG. 1 shows a small-sized portable information processing apparatus having a cooling means of this invention with a lid opened in an operating condition. The apparatus body 1 has a key board 2 as an input means of an operating section. Also, the apparatus body 1 is connected to a lid 5 having a display 4 by means of a hinge 3. As shown, when the lid 5 is opened with respect to the apparatus body 1, the keyboard 2 is exposed to allow an operator to operate the keyboard 2 and the display 4 provided at the inside of the lid 5 is also exposed in an inclined state thereof to allow the operator to watch the display 4 during a keyboard operation.

The keyboard 2 is accommodated within the apparatus body 1, the front end of the keyboard 2 (the operator side) is pivotably connected to the apparatus body 1 although not shown in detail and the rear end of the keyboard 2 (the hinge 3 side) is connected to a guide member by means of hinge means, as described later in detail, so that when the lid 5 is opened, the rear end of the keyboard 2 is lifted so that the keyboard 2 is inclined. Therefore, in this state, an air introduction port 6 is formed under the keyboard 2 for heat irradiation.

The lid is provided at the inside thereof with a pair of projections 7 near the hinge 3 and, on the other hand, the apparatus body 1 is provided with a pair of windows 8 near the hinge 3 at positions corresponding to the pair of projections 7 so that, when the lid 5 is closed, the pair of projections 7 pass through the pair of windows 8, respectively.

Figure 2:
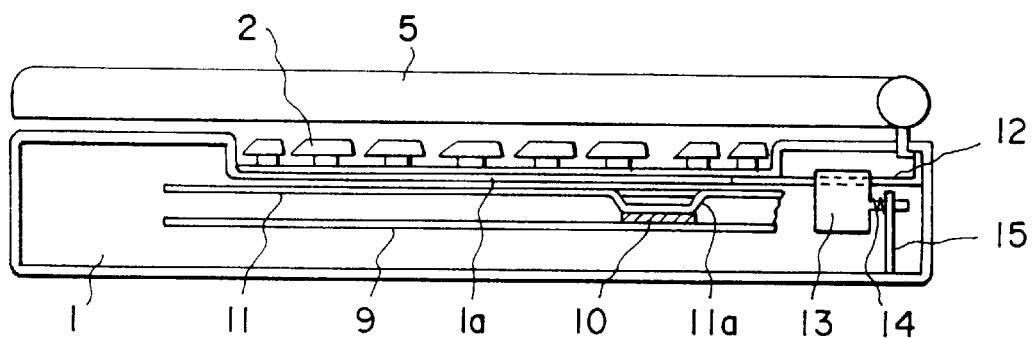
FIG. 2 is a schematic cross-sectional view showing a first embodiment of this invention with the lid closed.
Figure 3:
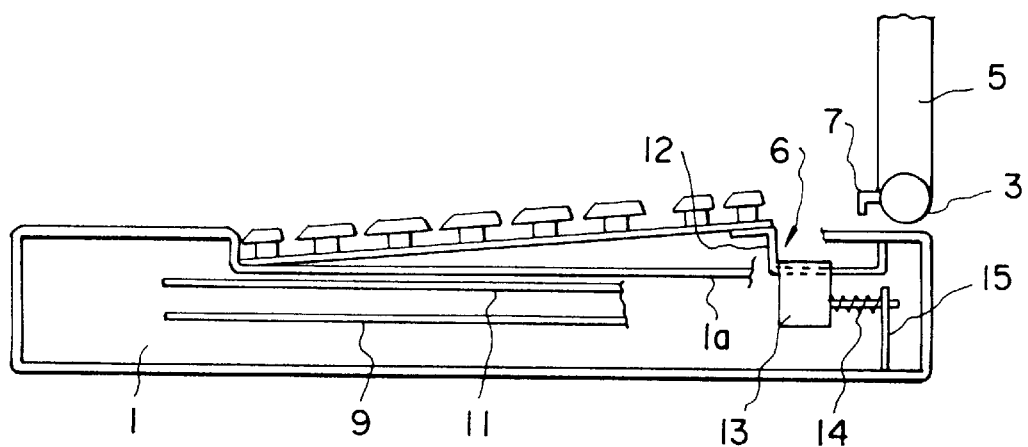
FIG. 3 is a schematic cross-sectional view showing a first-embodiment of this invention with the lid opened.
Figure 4:
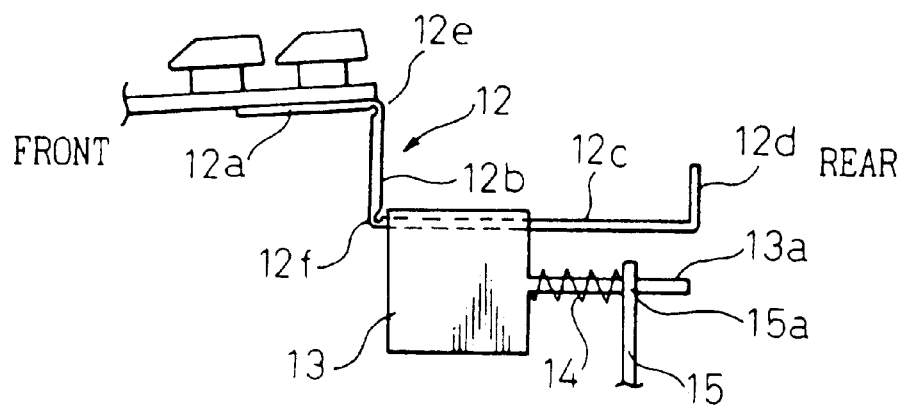
FIG. 4 is a partial enlarged cross-sectional view showing a part of FIG. 3.

FIGS. 2 to 4 show a first embodiment of this invention, wherein FIG. 2 is a schematic cross-sectional view of the apparatus with the lid closed, FIG. 3 is a schematic cross-sectional view of the same apparatus with the lid opened, and FIG. 4 is an enlarged view showing a part of FIG. 3.

A printed circuit board 9 is disposed in the apparatus body 1 and a various electronic elements are mounted thereon. To improve the heat radiation for heat radiating electronic elements, such as CPU 10 or the like, the elements are mounted on the board 9 to be in contact with a bent portion 11a of a heat radiation plate 11 arranged substantially in parallel to the printed circuit board 9. The heat radiation plate 11 is adjacent and in parallel to the bottom 1a for keyboard accommodation, so that the heat generated in the CPU 10 or the like can easily be passed through the heat radiation plate 11 and the keyboard accommodation bottom 1a to the outside. Particularly, as shown in FIG. 3, when the lid 5 is opened in the operating state, the rear end of the keyboard 2 is raised so that the air introduction port 6 is formed to discharge the heat to the outside through the port 6 to improve the heat radiation effects.

Figure 5:
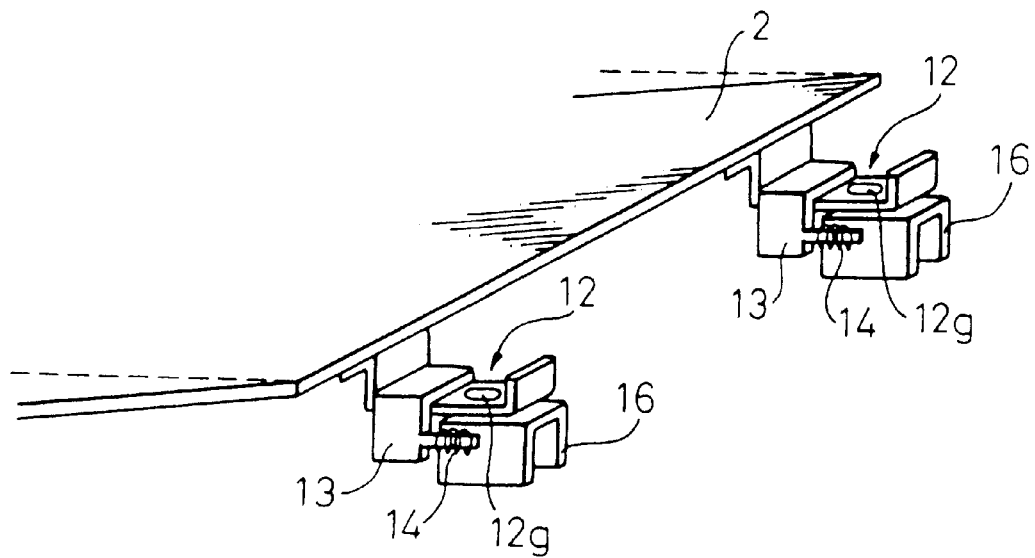
FIG. 5 is a perspective view showing a part of keyboard operation means of the first embodiment.

As shown in detail in FIGS. 4 and 5, the keyboard 2 is connected, at the rear end thereof and near to the left and right edges thereof, to a pair of hinge members 12. Each hinge member 12 is formed of an appropriate resin plate and comprises a front end portion 12a connected to a back surface of the keyboard 12, an intermediate portion 12b and a rear end portion 12c which has a raised portion 12d at the rear end thereof. There are hinge portions 12e and 12f, the thickness thereof being reduced to be bendable, between the front end portion 12a and the intermediate portion 12b and between the intermediate portion 12b and the rear end portion 12c. It should be appreciated that the hinge portion 12e is defined by a lower cut and the hinge portion 12f is defined by an upper cut, which are bendable only in the respective one direction as shown in FIG. 4.

The guide member 13, formed of a suitable metal, has a substantially reversed U-shape and is attached to the hinge member 12 near the hinge portion 12f of the intermediate portion 12b. Bar-like extensions 13a integrally extend to the rearward from the respective sides of the reversed U-shape guide member 13 and fit into the respective holes 15a of the stay 15. A compression spring 14 is provided on each of the extensions 13a, so that the guide member 13 is always urged forwardly to maintain the hinge member 12 in a state as shown in FIGS. 3 and 4, i.e., the state in which the hinge portion 12e between the front end of the guide member and the intermediate portion 12b and the hinge portion 12f between the intermediate portion 12b and the rear end portion 12c are bent at substantially 90°, respectively.

In this state, the rear end of the keyboard 2 is kept in a raised position and the keyboard 2 is inclined in such a manner that an operator can easily operate the keyboard 2. On the other hand, since the keyboard 2 is kept inclined, the air introduction port 7 is opened to improve the cooling efficiency.

Figure 6:
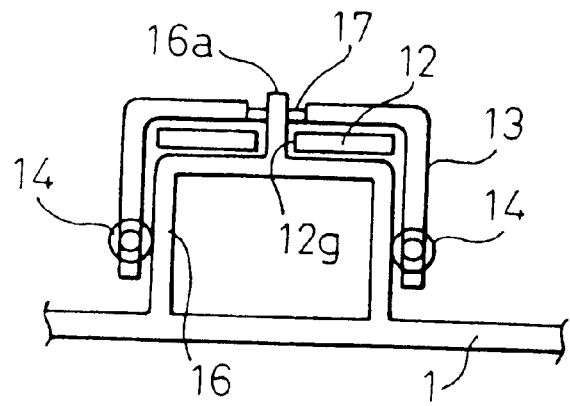
FIG. 6 is a cross-sectional view showing a part of keyboard operation means shown in FIG. 5.

The hinge member 12 is guided, as shown in FIGS. 5 and 6, by its intermediate portion 12b which is guided along a fixed guide member 16 attached to the bottom of the apparatus body 1. That is to say, the intermediate portion 12b of the hinge member 12 is provided with an elongated slot 12g with which a pin 16a is engaged. The pin 16a is fixed to and upwardly extends from the fixed guide member 16. Therefore, the hinge member 12 can only be moved within a predetermined distance restricted by the guide for the pin 16a and the elongated slot 12g. The pin 16a is provided with a retainer ring 17 to prevent removal of the hinge member 12.

As described above, since the inside of the lid 5 is provided with a pair of projections 7 near the hinge 3, when the lid 5 is closed, the pair of projections 7 pass through the pair of windows 8 (FIG. 1), respectively, to push the raised portion 12d (FIG. 4) at the rear end of the hinge member 12 rearwardly. Therefore, at this time, the hinge member 12 and the guide member 13 are moved rearwardly against the spring 14, so that the hinge member 12 is moved to a state as shown in FIG. 2, i.e., the state in which the hinge portion 12e between the front end of the guide member and the intermediate portion 12b and the hinge portion 12f between the intermediate portion 12b and the rear end portion 12c are on a substantially flat surface.

In this state, the rear end of the keyboard 2 is lowered to close the air introduction port 7 and the lid 5 having a display 4 at the inside thereof is closed in such a manner that the display 4 does not interfere with the keyboard 2.

When the lid 5 is opened, the pair of projections 7 move forwardly with the rotation of the lid 5, the raised portion 12d (FIG. 4) provided at the rear end of the hinge member 12 is allowed to move forwardly and the projection 7 moves away from the hinge member so that the hinge member 12 and the guide member 13 are moved forwardly by the spring 14 and the hinge member 12 is now in the position of FIGS. 3 and 4 in which the keyboard 2 is kept to be inclined and the air introduction port 6 is opened.

Figure 7:
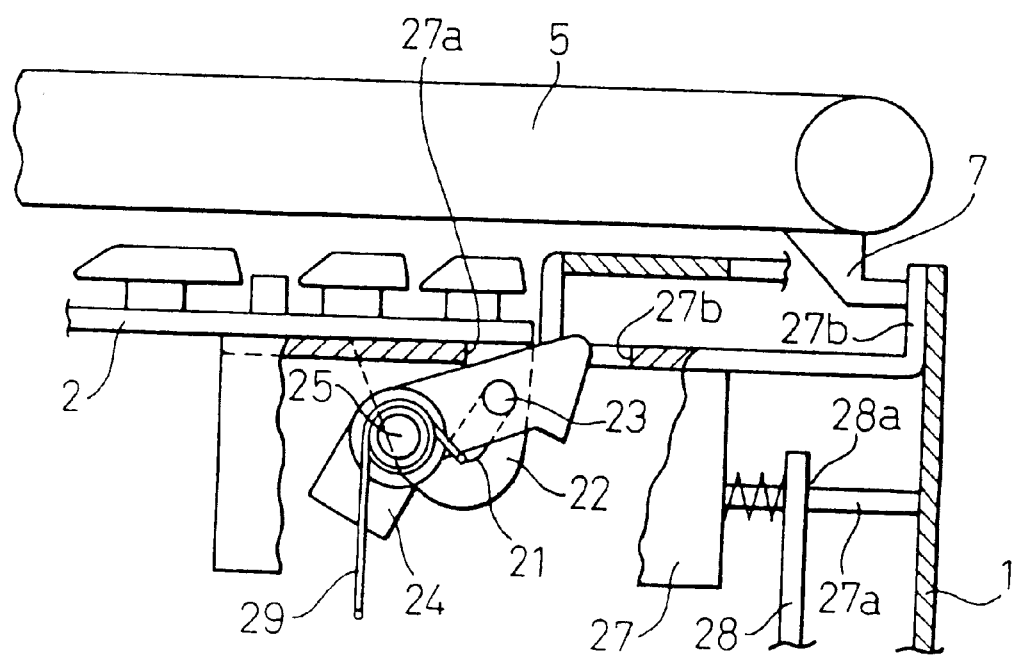
FIG. 7 is a schematic cross-sectional view showing a second embodiment of this invention with the lid closed.
Figure 8:
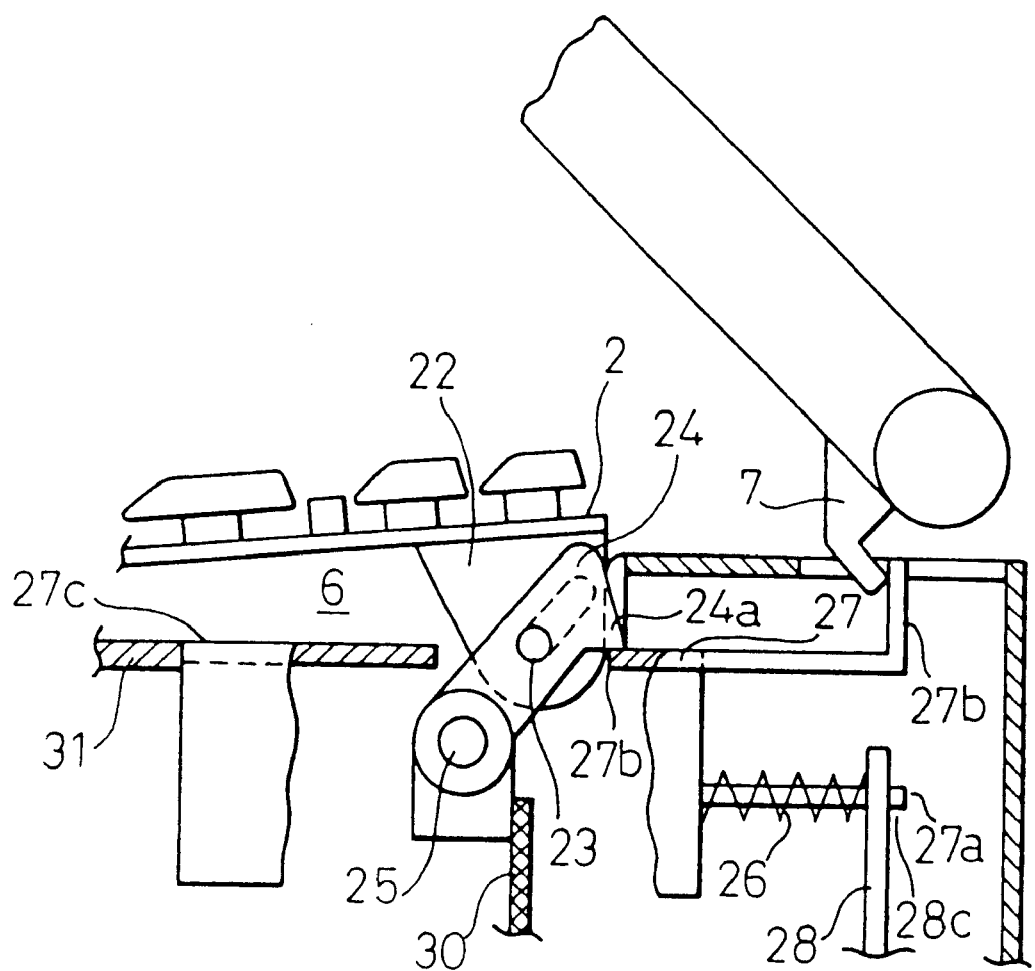
FIG. 8 is a schematic cross-sectional view showing the second embodiment of this invention with the lid opened.

FIGS. 7 and 8 show a second embodiment of this invention, in which FIG. 7 is a schematic cross-sectional view of the main part of the apparatus with the lid closed and FIG. 8 is a schematic cross-sectional view similar to FIG. 7, but the lid opened.

In this embodiment, a pair of flanges 22 are attached to the keyboard 2 at the rear end thereof and near to the left and right edges thereof. On the other hand, the apparatus body 1 is provided with a pair of ratchet members 24 rotatably attached to the stationary shaft 25, respectively, corresponding to the pair of flanges 22. Each of the ratchet members 24 has a pin 23 which engages with an elongated hole 21. The respective ratchet members 24 are always urged to rotate in the counterclock direction by torsion coil springs 29.

Since the ratchet members 24 are always urged by the torsion coil springs 29 to rotate in the counterclockwise direction, the pins 23 of the ratchet members 24 push up the flange 22 so that the keyboard 2 is inclined by raising the rear end thereof, as shown in FIG. 8, to keep the keyboard 2 in an operating position.

The guide members 27 having substantially reverse U-shaped cross-section are slidably supported within a certain distance in the front and rear direction, in the same manner as the hinge member 12 of the previous embodiment. The bar-like extension 27a integral with the guide member 27 extend rearward so as to be fitted into the holes 28a of the stays fixed to the bottom of the apparatus body 1 and are always urged forward by the compression coil springs 26 provided between the extension and the stay 28.

The rear end of the guide member 27 has a raised portion 27b, in the same manner as the rear end of the hinge member 12 of the previous embodiment. When the lid 5 is closed, the pair of projections 7 pass through the pair of windows 8 (FIG. 1), respectively, into the apparatus body 1 to push rearward the raised portion 27b (FIG. 4) at the rear end of the guide member 27. Therefore, at this time, the guide member 27 is slidingly moved rearward against the spring 26, so that the front edge 27a of the opening pushes the ratchet member 24 to rotate it in the clockwise direction against the torsion coil spring 29 to raise the rear end of the keyboard 2 through the pin 23 of the ratchet member 24 and the elongated hole 21 of the flange 22.

During the non-operating condition in which the lid 5 is closed as shown in FIG. 7, keyboard 2 is in its lowered position and the air introduction port 6 is closed. In this state, the display 4 on the inside of the lid 5 does not interfere with the keyboard 2.

When the lid 5 is opened, the pair of projections 7 move forwardly with the rotation of the lid 5, the raised portion 27b provided at the rear end of the guide member 27 is disengaged from the projection 7 so that the guide member 27 is moved forward by the compression spring 26 and moves forward until the front end 27c of the guide member 27 meets the stationary stopper 31. On the other hand, the ratchet member 24 is rotated in the counterclockwise direction by the torsion coil spring 29 and pushes up the rear end of the keyboard 2 through the elongated slot which is engaged with the pin 23 of the ratchet member 24 so that the keyboard 2 is kept in its inclined position in which the rear end of the keyboard 2 is raised.

The ratchet member 24 rotates in the counterclockwise direction until it comes into contact with the stopper 30 fixed to the apparatus body 1. However, at this moment, the front end 27c of the guide member 27 moved forward by the compression coil spring 26 stops when it comes into contact with the above-mentioned stopper 30 fixed to the apparatus body 1. In this state, the extension 24a of the ratch member 24 is engaged with the rear edge 27b of the opening of the guide member 27 so that the keyboard 2 is kept in its locked position. Therefore, in this state, even if a strong force is exerted to lower the keyboard 2 during the keyboard operation, the extension 24a of the ratch member 24 is locked by the rear edge 27b of the opening of the slide member 27 and, therefore, any movement of the keyboard 2 is prevented. In addition, during the operation in which the lid 5 is opened, the air introduction port 6 is opened to cool the inside of the apparatus body 1 in the same manner as the previous embodiment.

It should be understood by those skilled in the art that the foregoing description relates to only some preferred embodiments of the disclosed invention, and that various changes and modifications may be made to the invention without departing from the spirit and scope thereof.

What is claimed is:

1. A processing apparatus comprising:
    an apparatus body containing an air introduction port;
    an operating section mounted on said apparatus body for movement between an inclined position in which said air introduction port is opened and a horizontal position in which said air introduction port is closed;
    a lid having a projection and being connected to said apparatus body for pivotal movement between an open position and a closed position; and
    means for moving said operating section between its inclined and closed positions and for activating a locking member including:
        a guide member mounted in said apparatus body for linear reciprocating movement therein,
        operating section activating means operated by movement of said guide member including a spring normally biasing said guide member in a direction to raise said operating section to its inclined position, and an engagement member carried by said guide member and being disposed thereon to be engaged by said projection of said lid upon movement of said lid to its closed position to move said guide member against a force of said spring and in a direction to place said operating section in its horizontal position upon movement of said lid toward its closed position.

2. The apparatus as set forth in claim 1, wherein said lid is provided with a display and said operating section is constituted as a keyboard.

3. The apparatus as set forth in claim 1, wherein said activating means comprises a hinge member having one end connected to said operating section and the other end containing said engaging means and being slidably mounted with respect to said guide member so as to be engagable with said projection.

4. The apparatus as set forth in claim 3, wherein said hinge member is made of a strip which comprises a first portion connected to said operating section, a second portion pivotally connected to said first portion and a third portion pivotally connected to said second portion, said third portion being slidingly supported on said guide member and having said engagement member formed by a raised portion engageable with said projection in such a manner that, when said operating section is in the inclined position, said second portion is bent by nearly 90° with respect to said first and third portions, respectively, and when said operating section is in the horizontal position, said second portion is kept substantially horizontal with respect to said first and third portions, respectively.

5. The apparatus as set forth in claim 4, including a locking/releasing member formed by said hinge member and a stopper for preventing said second portion from being bent more than 90° with respect to said first and third portions at said inclined position of the operating section.

6. The apparatus as set forth in claim 5, wherein said activating means comprises said guide member and an angle-changing member for changing an angle of inclination of the operating section in accordance with a sliding movement of said guide member.

7. The apparatus as set forth in claim 6, wherein said angle-changing member comprises a flange fixed to said operating section and has an elongated slot, a ratch member having a pin engaged with said elongated slot, and a spring for urging said ratch member so as to move said operating section toward its horizontal position.

8. The apparatus as set forth in claim 7, wherein said guide member is provided with an opening having respective edges and said ratch member is provided with an extension so that, when said lid is in its closed position, one of said edges of the opening engages with said extension of the ratch member to lock said operating section at the inclined position and, when said lid is moved toward its closed position, said one edge of the opening is disengaged from the extension of the ratch member and the other edge of said opening pushes and rotates said operating section to move it toward its horizontal position.

* * * * *